(12) United States Patent
Vendrow et al.

(10) Patent No.: US 8,204,479 B2
(45) Date of Patent: Jun. 19, 2012

(54) LINE NUMBER PORTING FOR MOBILE DEVICES

(75) Inventors: Vlad Vendrow, Redwood Shores, CA (US); Bruce Young, San Jose, CA (US); Praful Shah, Los Altos Hills, CA (US); Boris Elpiner, Sunnyvale, CA (US); Vladimir Shmunis, Hillsborough, CA (US)

(73) Assignee: RingCentral, Inc., San Mateo, CA (US)

( * ) Notice: Subject to any disclaimer, the term of this patent is extended or adjusted under 35 U.S.C. 154(b) by 381 days.

(21) Appl. No.: 12/620,915

(22) Filed: Nov. 18, 2009

(65) Prior Publication Data

US 2010/0184408 A1 Jul. 22, 2010

Related U.S. Application Data

(60) Provisional application No. 61/117,915, filed on Nov. 25, 2008.

(51) Int. Cl.
*H04M 1/66* (2006.01)
(52) U.S. Cl. ........ 455/411; 455/445; 455/436; 455/461; 370/358; 370/401
(58) Field of Classification Search .................. 455/411, 455/461, 445, 436; 370/358, 401
See application file for complete search history.

(56) References Cited

U.S. PATENT DOCUMENTS

| 2005/0074110 A1* | 4/2005 | Moreman ................ 379/212.01 |
| 2008/0101585 A1* | 5/2008 | Brown et al. ............ 379/221.13 |

FOREIGN PATENT DOCUMENTS

| KR | 10-2001-0011139 | 2/2001 |
| KR | 10-2005-0116096 | 12/2005 |
| KR | 10-0576729 B1 | 5/2006 |

OTHER PUBLICATIONS

Authorized officer Park Jang Hwan, International Search Report/Written Opinion in PCT/US2009/065985 mailed Jun. 18, 2010, 10 pages.

* cited by examiner

*Primary Examiner* — Kamran Afshar
*Assistant Examiner* — Manpreet Matharu
(74) *Attorney, Agent, or Firm* — Fish & Richardson P.C.

(57) ABSTRACT

Methods, systems, apparatus including computer program products having instructions for porting numbers are provided. In one example system and method, a vPBX system can receive a request from a user to port an existing phone number to the vPBX system. The vPBX server can identify a porting authentication template, based on the requirements of an existing service provider. The vPBX server generate a fax document on the retrieved template. The vPBX server can populate the generated fax document with user information. The vPBX server can receive a user's hand signature from a touch-screen interface of a mobile device. The vPBX server can authenticate the fax document with the received signature, and transmit the authenticated fax document to the existing service provider. The vPBX server can provide the user with a temporary line number with forwarding functions until porting is completed.

20 Claims, 8 Drawing Sheets

LINE NUMBER PORTING FOR MOBILE DEVICES

CROSS-REFERENCE TO RELATED APPLICATION

This application claims the benefit of priority to U.S. Provisional Application Ser. No. 61/117,915 titled "LINE NUMBER PORTING FOR MOBILE DEVICES", filed on Nov. 25, 2008, the disclosure of which is incorporated herein by reference in its entirety.

TECHNICAL FIELD

This subject matter relates to line number porting techniques.

BACKGROUND

A private branch exchange (PBX) is a telephone network that serves a business or an office. A virtual PBX (vPBX) system hosted on remote servers can be used to support one or more businesses or offices, and to provide services through a voice network (e.g. telephone network), data network (e.g. Internet) or a combination thereof.

Generally, a user can migrate a line number outside a vPBX network to a line number within the vPBX network. However, before the outside line number can be ported into an extension inside the vPBX network, a customer service representative need be contacted who can facilitate the line porting process.

SUMMARY

Once a user establishes an account on a vPBX system, the user can port an existing number to a number within the vPBX system, for example, without the need to contact a live operator or customer service representative. The user can access a vPBX server from a mobile device. The user can enter information on a mobile device for the existing number to be ported. The vPBX server can determine an existing user service provider based on the existing number. The vPBX server can include a database storing information on service provider requirements for porting numbers. If a service provider requires a signed document for porting a number, the vPBX server can select a fax document template that has been tailored to the service provider. The vPBX server can populate the fax document template with user information to generate a fax document. The vPBX server can send the fax document to the user's mobile device for a hand signature. The vPBX server can send the signed fax document to the existing service provider to facilitate line number porting.

In some implementations, a method can be used that includes receiving a request to migrate a phone number associated with a user from an existing service provider to a new service provider; retrieving migration information associated with the existing service provider; receiving authorization information from a mobile device associated with the user; generating a migration document including the migration information and the authorization information; and transmitting the migration document to the existing service provider.

In some implementations, a method can be used that includes retrieving information at a mobile device, the information including at least one of user information or mobile device information; generating, at the mobile device, a request associated with creating a migration document by a server using the retrieved information, the migration document containing migration information associated with an existing service provider and the retrieved information; and transmitting the request to the server.

In some implementations, a method can be used that includes accessing a remote server using a mobile device to retrieve a migration document stored on the remote server, the migration document containing a request to migrate a phone number associated with the mobile device from an existing service provider to a new service provider; manipulating the migration document through an interface provided by the mobile device; authenticating the manipulated migration document using the interface; and transmitting the authenticated migration document from the remote server to the existing service provider.

The details of one or more implementations of line number porting for mobile devices are set forth in the accompanying drawings and the description below. Other features, objects, and advantages of the techniques will be apparent from the description and drawings, and from the claims.

DESCRIPTION OF DRAWINGS

Like reference symbols in the various drawings indicate like elements.

DETAILED DESCRIPTION

As will be described in greater detail below, in some implementations, a vPBX server can be used to assist users in porting or transferring one or more existing line numbers associated with a first device to a second device. As an example, the vPBX server can query a user to enter an existing line number to be ported. An existing line number can be a regular number or a toll-free number. After receiving the prompt from the vPBX server, the user can enter the line number, and specify a type of the existing line associated with the line number (e.g., whether the line is residential, business, or mobile type). Alternatively, the type of the line number can be determined by the vPBX server.

The vPBX server can then check whether the line number entered by the user can be ported. The portability of the number can vary, depending on the service provider who assigned the number. cancancan To check whether a particular number can be ported, in some implementations, the service provider associated with the number can be identified and the status and portability of the particular number can be determined through the identified service provider. In some implementations, if the number can be ported, the vPBX server can generate an authorization form tailored to a user's current service provider, and send a confirmation email with the authorization form to the user.

Some service providers can require users to fax a signed authorization form to authorize the service providers to initiate the portability process. In some implementations, the vPBX server can include a send fax feature that allows users to fax the signed authorization form to the service providers. In some implementations, the vPBX server also can support authenticated fax transmission from mobile devices. In these implementations, the send fax feature also can allow users to transmit the signed authorization form from a mobile device.

Call Management System Overview

Figure 1:
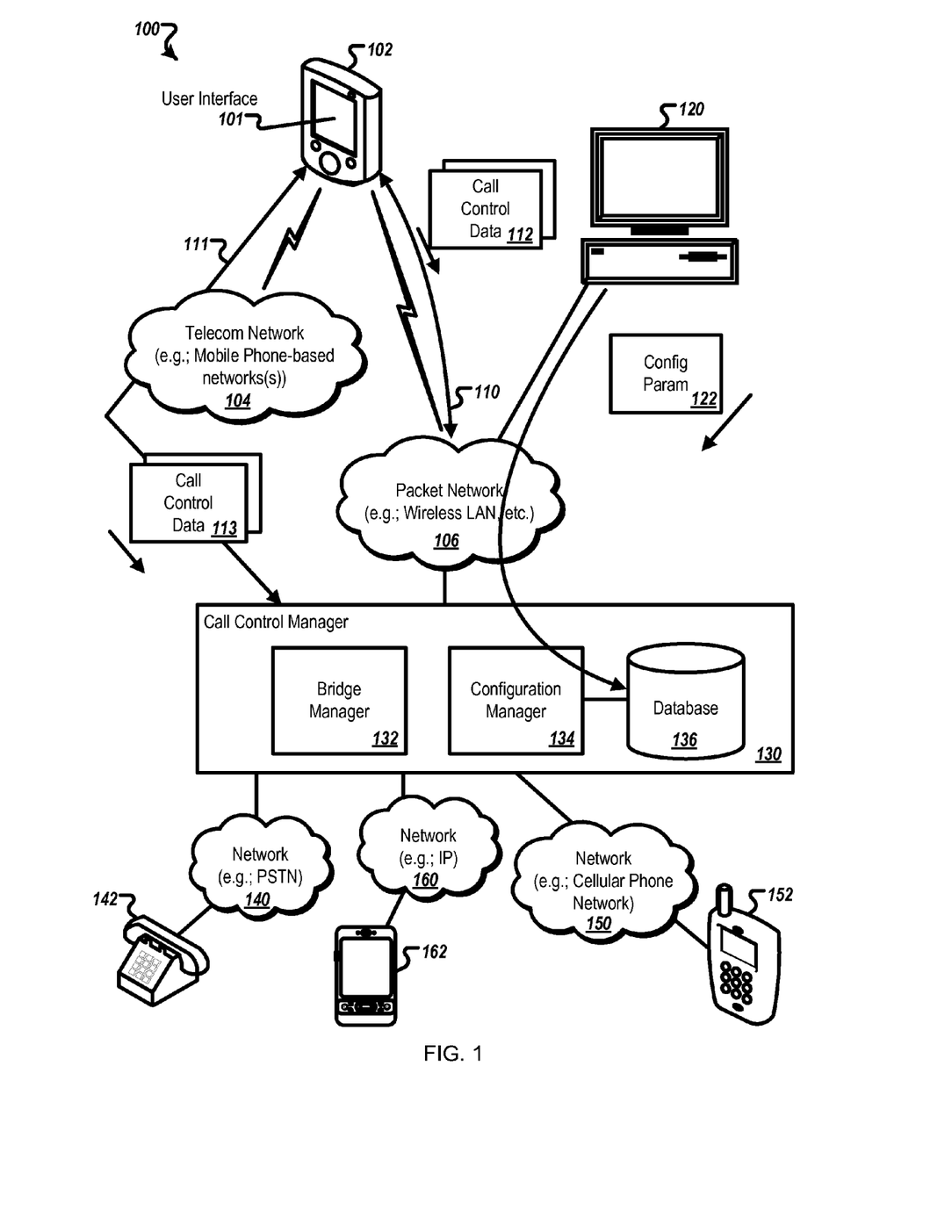
FIG. 1 shows an example of a call management system.

FIG. 1 shows an example of a call management system 100. As shown in FIG. 1, the mobile device 102 can be connected to a telecom network 104 and a packet network 106. The mobile device 102 can be configured to communicate with devices connected to the telecom network 104 and the packet network 106 using multiple modes of communication (i.e., "multi-modal channels of communication").

In some implementations, the telecom network 104 and the packet network 106 can each operate in a same or different mode of communication. For example, the telecom network 104 can operate in accordance with a first mode of communication. Examples of the first mode of communication can include Public Switched Telephone Network ("PSTN") phone modes, cellular/wireless telephone technology modes, such as Global System for Mobile communications ("GSM"), Frequency Division Multiple Access ("FDMA"), Time Division Multiple Access ("TDMA"), Code Division Multiple Access ("CDMA"), and the like.

The packet network 106 can operate in accordance with a second mode of communication. Examples of the second mode of communication include Voice over Internet Protocol (VOIP) modes, wireless LAN modes (e.g., telephone technologies/standards, such as WiMAX and any other IEEE 802.xx-based modes), and the like. Any number of modes is possible.

A call manager 130 can be coupled to the mobile device 102 through the telecom network 104 or the packet network 106. For example, the mobile device 102 can be configured to interact with the call control manager 130 over a call control communications channel. In some implementations, the call communications channel can include a broadband call control channel 110, and the broadband call control channel 110 can be established with the packet network 106 (e.g., in the same or separate channel used to convey voice/video data, such as in a Session Initiation Protocol ("SIP") message).

In some implementations, the call communications channel also can include a narrowband call control channel 111, and the narrowband call control channel 111 can be established with the telecom network 104 (e.g., a mobile operator can be provided in the same or separate channel used to convey voice/video data, such as in an Short Message Service ("SMS") message). The mobile device 102 and/or the call control manager 130 can be configured to transmit and/or receive call control data 113 and call control data 112 over the narrowband call control channel 111 and over the broadband call control channel 110, respectively. The call control manager 130 can be configured to effect a number of call controlling functions that can be performed remotely from the mobile device 102. Thus, the call control manager 130 can perform call control operations in association with a first call from a communications device 142 via a PSTN network 140, a second call from a communications device 152 via an internet protocol (IP) network 150, and/or a third call from a communications device 162 via a cellular phone network 160.

In some implementations, the call control manager 130 can be disposed in a central office ("CO"). In some implementations, the mobile device 102 can include an interface 101 (e.g., a user interface) for facilitating the generation, receipt, processing, and management of the call control data 112 and 113 for delivery over the narrowband call control channel 111 and/or the broadband call control channel 110. The interface 101 can be configured to implement the functionalities described therein, including receiving inbound calls, dialing outbound calls, and the like.

In some implementations, the call control manager 130 can include a bridge manager 204, a configuration manager 134, and a repository database ("DB") 136. The bridge manager 204 can be configured to perform, without limitation, inbound call delivery, call routing, call transfer functions, conference call functions for the mobile device 102. For example, an inbound missed call can be recorded (e.g., voice mail) on the mobile device 102 and/or on the call control manager 130 and simultaneously reviewed on the mobile device 102 via the interface 101. During call recording, the call manager 130 can allow the inbound call to be answered dynamically at the mobile device 102 and/or transferred to one of the communications devices 142, 152, and 162. Completed recordings (e.g., announcements, voice mail, etc.) can be reviewed at the mobile device 102 via the interface 101.

The configuration manager 134 can be configured to interact with a remote computing device 120 or with the mobile device 102 to receive configuration parameter data ("conf param") 122. The configuration manager 134 can store the configuration parameter data 122, and responsive to such data, the call control manager 130 can control inbound calls before, during, or after reaching the mobile device 102. The configuration manager 134 also can be configured to store in the database 136 audio files recorded through the interface 101 on the mobile device 102, and transmit the stored files to the mobile device 102 using the narrowband call control channel 111 and/or the broadband call control channel 110.

Call Manager

Figure 2:
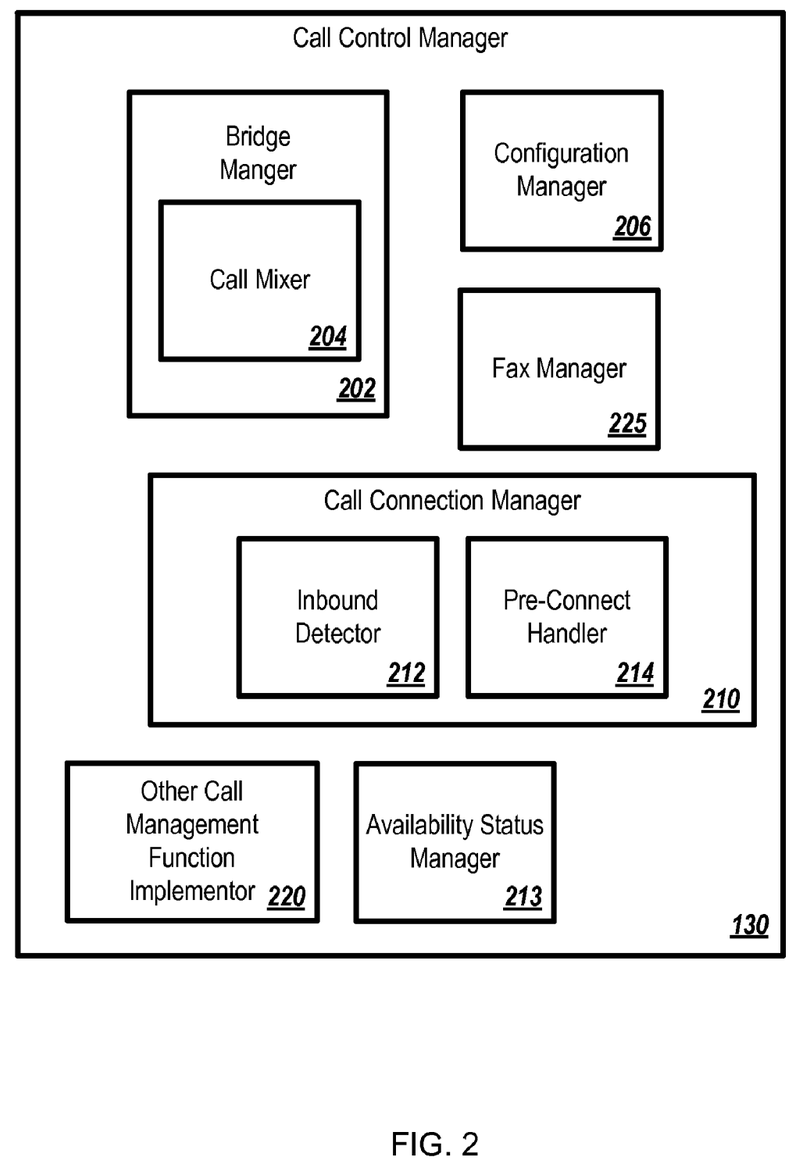
FIG. 2 shows an example of a call control manager.

FIG. 2 shows an example of the call control manager 130. Referring to FIG. 2, the call control manager 130 can include a bridge manager 132, a configuration manager 134, a call connection manager 210, an available status manager 213, a fax manager 225, and a call management function 220 configured to implement one or more call control functions described herein.

The bridge manager 132 also can include a call mixer 204. In some implementations, the call mixer 204 can be configured to combine calls using various telecommunication technologies and protocols. The call mixer 204 can use different CODECs to implement the various telecommunication technologies and protocols. In some implementations, the mixer 204 can reside in the mobile device 102. In some implementations, the mixer can be external to the mobile device 102.

The call connection manager 210 can include an inbound detector 212 and a pre-connect handler 214. The inbound detector 212 can detect a call from any communications device (e.g., communications devices 142/152/162 shown in FIG. 1) and determine whether a communication link to the mobile device 102 via the packet network 106 of FIG. 1 can be established. For example, the inbound detector 212 can communicate with the mobile device 102 to determine whether a data rate of more than, for example, 8 kb/sec is obtainable. If the specified data rate is not practicable, the inbound detector 212 can provide a course of action (e.g., directing the call to the user's voicemail) until the specified data rate is above an acceptable threshold.

In some implementations, the call control data 112 can contain one or more call-related (or non-call related) instructions related to handing one or more calls from the communications devices 142/152/162. In some implementations, the pre-connect handler 214 can interact with the mobile device 102 to receive these instructions before establishing a connection with the communications devices 142/152/162.

Similarly, the call control data 113 can contain one or more call-related (or non-call related) instructions related to handing one or more calls from the communications devices 142/152/162. In some implementations, the call control data 113 can be incorporated into an SMS message (or any other type of messaging protocol) that can be sent to the control manager 130 using the telecom network 104. For example, the mobile device 102 can generate the call control data 113, and the call control data 113 can include an instruction that instructs the call control manager 130 to transmit a message to the communications devices 142/152/162. An example of such a message can include, for example, "I am out of wireless LAN range. I will call you later when I can make a VOIP call." Any of the components of the call control manager 130 can be implemented in hardware or software, or a combination thereof.

Mobile Device Implementation

Figure 3:
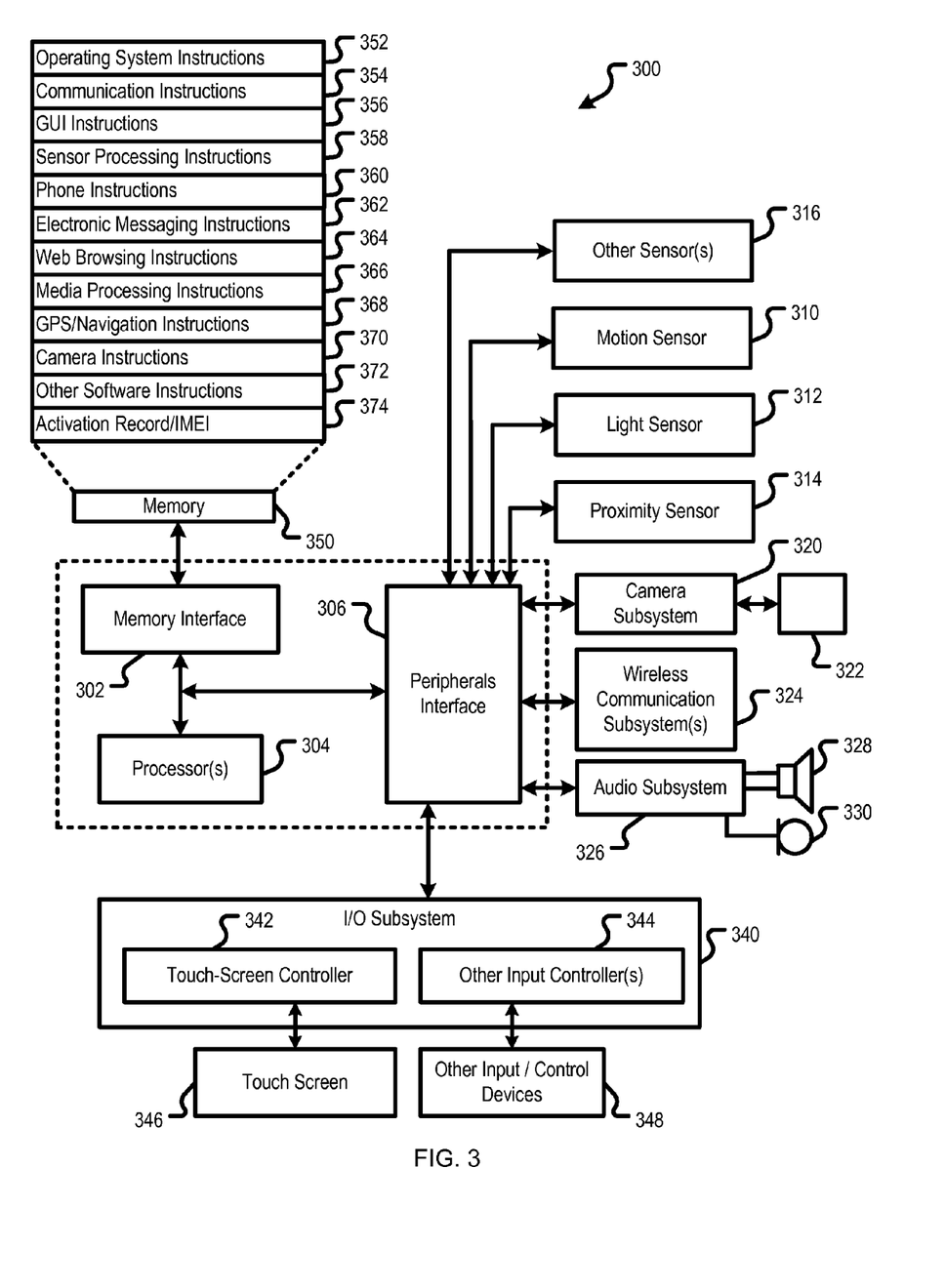
FIG. 3 shows an example of a mobile device.

FIG. 3 shows an example of a mobile device 300. The mobile device 300 can include a memory interface 302, one or more data processors, image processors and/or central processing units 304, and a peripherals interface 306. The memory interface 302, the one or more processors 304 and/or the peripherals interface 306 can be separate components or can be integrated in one or more integrated circuits. The various components in the mobile device can be coupled by one or more communication buses or signal lines.

Sensors, devices, and subsystems can be coupled to the peripherals interface 306 to facilitate multiple functionalities. For example, a motion sensor 310, a light sensor 312, and a proximity sensor 314 can be coupled to the peripherals interface 306 to facilitate orientation, lighting, and proximity functions. Other sensors 316 also can be connected to the peripherals interface 306, such as a positioning system (e.g., GPS receiver), a temperature sensor, a biometric sensor, or other sensing device, to facilitate related functionalities.

A camera subsystem 320 and an optical sensor 322 (e.g., a charged coupled device ("CCD") or a complementary metal-oxide semiconductor ("CMOS") optical sensor) can be utilized to facilitate camera functions, such as recording photographs and video clips.

Communication functions of the mobile device 300 can be facilitated through one or more wireless communication subsystems 324, which can include radio frequency receivers and transmitters and/or optical (e.g., infrared) receivers and transmitters. The specific design and implementation of the communication subsystem 324 can depend on the communication network(s) over which the mobile device is intended to operate. For example, a mobile device can include communication subsystems 324 designed to operate over a GSM network, a GPRS network, an EDGE network, a Wi-Fi or WiMax network, and a Bluetooth™ network. In particular, the wireless communication subsystems 324 can include hosting protocols such that the mobile device can be configured as a base station for other wireless devices.

An audio subsystem 326 can be coupled to a speaker 328 and a microphone 330 to facilitate voice-enabled functions, such as voice recognition, voice replication, digital recording, and telephony functions.

The I/O subsystem 340 can include a touch screen controller 342 and/or other input controller(s) 344. The touch-screen controller 342 can be coupled to a touch screen 346. The touch screen 346 and touch screen controller 342 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 346.

The other input controller(s) 344 can be coupled to other input/control devices 348, such as, without limitation, one or more buttons, rocker switches, thumb-wheel, infrared port, USB port, and/or a pointer device such as a stylus. The one or more buttons (not shown) can include an up/down button for volume control of the speaker 328 and/or the microphone 330.

In some implementations, a pressing of the button for a first duration can disengage a lock of the touch screen 346, and a pressing of the button for a second duration that is longer than the first duration can turn power to the mobile device 300 on or off. The user can customize the functionality of the buttons in any desirable manner. The touch screen 346 also can be used to implement virtual or soft buttons and/or a keyboard.

In some implementations, the mobile device 300 can present recorded audio and/or video files, such as, without limitation, MP3, AAC, and MPEG files.

The memory interface 302 can be coupled to the memory 350. The memory 350 can include high-speed random access memory and/or non-volatile memory, such as one or more magnetic disk storage devices, one or more optical storage devices, and/or flash memory (e.g., NAND, NOR). The memory 350 can store an operating system 352, such as, without limitation, Darwin, RTXC, LINUX, UNIX, OS X, WINDOWS, or an embedded operating system such as VxWorks. The operating system 352 can include instructions for handling basic system services and for performing hardware dependent tasks. In some implementations, the operating system 352 can be a kernel (e.g., UNIX kernel). If the service provider permits porting out line numbers, the service provider can require an authorization form.

The memory 350 can also store communication instructions 354 to facilitate communicating with one or more additional devices, one or more computers and/or one or more servers. The memory 350 can include graphical user interface instructions 356 to facilitate graphic user interface processing; sensor processing instructions 358 to facilitate sensor-related processing and functions; phone instructions 360 to facilitate phone-related processes and functions; electronic messaging instructions 362 to facilitate electronic-messaging related processes and functions; web browsing instructions 364 to facilitate web browsing-related processes and functions; media processing instructions 366 to facilitate media processing-related processes and functions; GPS/Navigation instructions 368 to facilitate GPS and navigation-related processes and instructions; camera instructions 370 to facilitate camera-related processes and functions; and/or other software instructions 372 to facilitate other processes and functions (e.g., access control management functions as will be described in reference to FIGS. 5 and 6).

The memory 350 also can store other software instructions (not shown), such as web video instructions to facilitate web video-related processes and functions, and/or web shopping instructions to facilitate web shopping-related processes and functions. In some implementations, the media processing instructions 366 can be divided into audio processing instructions and video processing instructions to facilitate audio processing-related processes and functions and video processing-related processes and functions, respectively. An activation record and International Mobile Equipment Identity ("IMEI") 374 or similar hardware identifier also can be stored in the memory 350.

Each of the above identified instructions and applications can correspond to a set of instructions for performing one or more functions described above. These instructions need not be implemented as separate software programs, procedures, or modules. The memory 350 also can include additional instructions or fewer instructions. Furthermore, various functions of the mobile device 300 can be implemented in hardware and/or in software, including in one or more signal processing and/or application specific integrated circuits.

Example Line Number Porting Process

Figure 4:
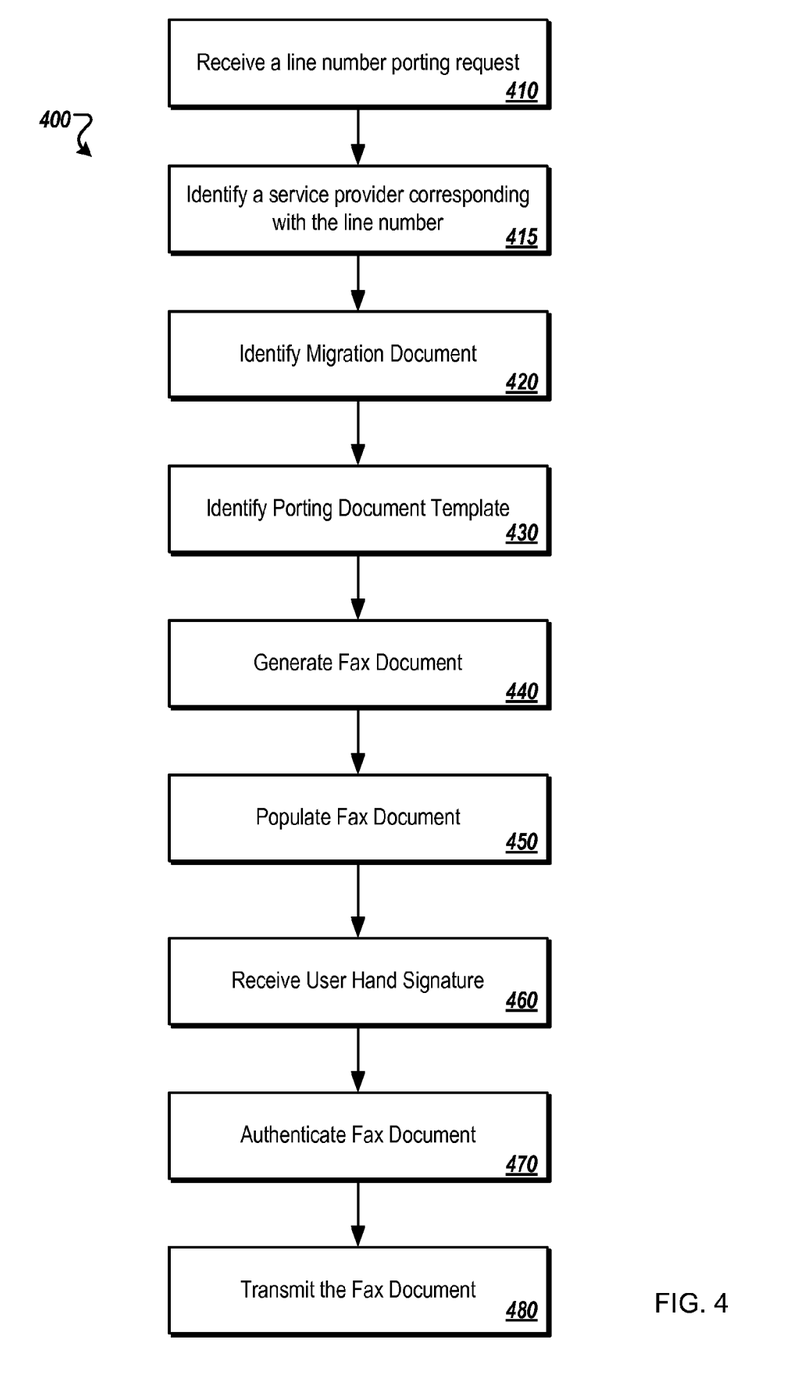
FIG. 4 shows an example of a process for porting a line number associated with a mobile device.

FIG. 4 shows an example of a process 400 for porting a line number associated with a mobile device. Referring to FIG. 4, a line number porting request is received (410). In some implementations, receiving a line number porting request can include displaying a user interface on a mobile device, requesting a user input for one or more existing line numbers and a type of each of the one or more existing line numbers through the user interface. Example types of a line number can include "residence," "business," or "mobile."

In some implementations, the user interface displayed on the mobile device can include a "check status" button to allow the user to manually initiate the line number porting process. For example, the user can enter an existing line number (e.g., that includes area code or 8xx prefix) on the mobile device, and tap the check status button to instruct a vPBX server to determine whether the one or more line numbers entered by the user can be ported.

After receiving the line number porting request, a service provider corresponding with each line number to be ported is identified (415). A vPBX server can identify the service provider by a variety of ways. For example, the vPBX server can include an input field in the user interface, and the user can input a service provider name in the input field. Alternatively, the vPBX server can identify the service provider by querying a publicly available database for 8xx numbers. An example of such a database can include the 800 Service Management System, commonly known as the SMS/800. If the user's existing number is not a 8xx number, the vPBX server can identify the user's existing service provider by mapping the area code of the user's existing number with a regional carrier or a cell phone carrier. After identifying the service provider, the vPBX server can determine whether the line number can be ported. In some implementations, the determination can be based on one or more number porting rules stored in a database on the vPBX server. Once the determination has been made, the name of the service provider and whether the line is portable can be displayed to the user through the user interface.

In some implementations, the vPBX can provide the user with a temporary line number while the user's existing number is being ported. The vPBX server can automatically link the user's existing number to the temporary line number using vPBX rules for forwarding between two numbers, while the actual migration is pending. In some implementations, all calls to the user's temporary line number also can be forwarded to the user's existing number (e.g., after completing the porting process).

In some implementations, the vPBX server can forward some, but not all, calls to the user's temporary line number to the user's existing number. For example, the vPBX server can forward the call if the call is not picked up at the temporary number after certain number of rings. As another example, the vPBX server can forward the call based on the geographic location of the user. In some implementations, the vPBX server can determine the user's geographic location by receiving geographic coordinates of the mobile device (e.g., where the mobile device is a location-aware mobile device). The mobile device can determine its geographic coordinates by retrieving information from a positioning system such as GPS. If the temporary number is assigned to a location-aware mobile device, the vPBX server also can forward the call to the user's existing number if the user is at the address associated with the existing number.

A migration document is identified (420). In some implementations, the vPBX can maintain a database that stores information on various service providers including associated porting authorization templates and forms required by each service provider. In some implementations, if the service provider requires a signed authorization form from the user before the porting process can take place, the vPBX server can retrieve the migration document from the database, and send the retrieved migration document to the user.

The service provider also can require different authentication forms for customers on various call plans or customers' geographic locations in accordance with federal, state, and local regulations or technical restraints. In some implementations, the vPBX server can display a second user interface on the user's mobile device, and identify a calling plan associated with the user through the user interface. The vPBX server can determine the geographic location of the user based on the area code of the user's existing number, and by the three digits that follow the area code in the existing number. The three digits that follow the area code typically indicate smaller geographical areas or individual telephone exchanges. Based on the determination of the service provider, a calling plan, and a location, the vPBX server can identify a corresponding authorization form template in the database.

A porting authorization template is identified (430). The porting authorization template can be a form template or a fax template. The porting authorization template can be created on the mobile device or downloaded from the service provider.

If the service provider requires the user to sign the authorization form and submit the form by fax, the vPBX server can display a user interface corresponding to an authorization form template that is tailored to the service provider. For example, the service provider can require the user to submit personal information in the authorization form, such as last four digits of a social security number, a PIN number, or a password. The user can enter personal information through the user interface. The personal information can be sent to the vPBX server by a variety of means (e.g., through an HTTPS request).

If the service provider requires an authorization form to be signed and faxed for porting a number out, the vPBX server can retrieve a fax document template. The fax document template can contain formatting information, such as, for example, bolding, capitalization, or other formatting rules for certain portions of a fax document. The fax document template also can contain company specific information, such as, for example, company logo, address, and phone number. The fax document template can further contain one or more placeholders for sender's information. The fax document template can be generated by the fax manager 225 of the call control manager 130. Alternatively, the fax document template can be generated by an external fax server.

In some implementations the fax document template can be transmitted to the mobile device. In other implementations, the fax document template can be sent to an editing area on a fax server, and the mobile device can function as a remote control terminal of the fax server.

As required, the fax document is generated (440). Generating a fax document can include loading the fax document template into a device memory. Generating the fax document also can include inserting fax content into the fax document template. The fax content can be standard text, and the standard text can be statements that instruct the service provider to port a specific phone number out to another service provider.

The fax document is populated and stored (450). Populating the fax document can include inserting a user's identity, existing phone number, address, and other personal information. Some of the information can be determined by the vPBX server based on the server's knowledge of the user. For example, the vPBX server can determine the user's identity by identifying the mobile device associated with the user. The vPBX server also can retrieve the user's name and address from a user database maintained by the vPBX server. The vPBX server further can populate fields that are specific to the user's existing service provider with values provided by the user.

As required, a user's signature can be retrieved/identified (460). Retrieving the user's signature can be useful when a service provider requires a signed fax before a particular number can be ported out. In some implementations, the user can sign the fax by writing a signature on a touch-sensitive screen of the mobile device. The signature can be in a form of freehand drawing.

The fax document can be authenticated, for example with the received hand signature (470). In some implementation, a freehand drawing can be inserted into a signature area of a fax document template. In some implementations, a user's freehand input on the mobile device can be used to identify a sender. The vPBX server can identify the sender by matching the signed signature with one or more stored signature images or usernames. Where the vPBX server maps the signature with one or more stored usernames, character recognition and approximation methods can be used. One exemplary mobile device that can receive freehand drawing as input and map the freehand drawing with one or more stored character sets such as Asian characters can include iPhone™ made by Apple® Inc., which is based in Cupertino, Calif. Once the vPBX server generates a map, the vPBX server can insert a pre-stored signature in the document.

In some implementations, the user can insert a signature to the fax document template by electronically logging in to the vPBX system. The fax server can insert a pre-stored digital signature to an out-going fax after authenticating the sender. An authentication can be made using a username/password combination. The authentication can also use location-based identification in addition or as an alternative to username/password combination. In some implementations, the sender can be authenticated only if the sender is physically in known location (e.g., the office). The vPBX server can infer that the sender is in the office by determining that the sender's mobile device is in the office. The vPBX server can determine that the sender's mobile device is in the office by matching geographic coordinates of the mobile device with a pre-stored geographic location of an "office."

Subsequently, the signed porting authorization form is transmitted to an existing service provider (480). In some implementations, the fax server can send multiple faxes to multiple service providers. The vPBX server can send a confirmation email to the user. The confirmation email can contain a record of the form submitted to the service provider and an copy of the signed fax.

Example Processes for Fax Transmission

Figure 5A:
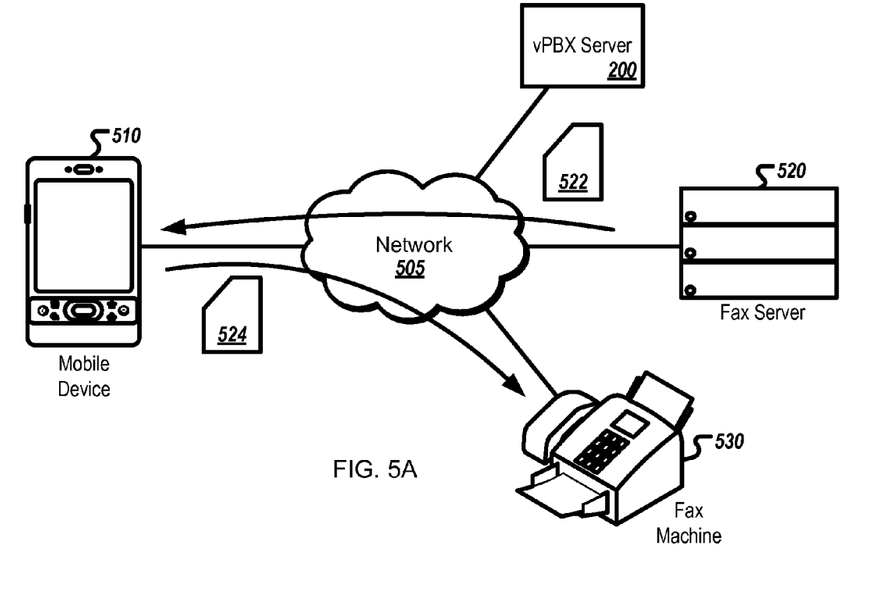
FIG. 5A illustrates a structure and flow in which a mobile device sends out a fax to a recipient.
Figure 5B:
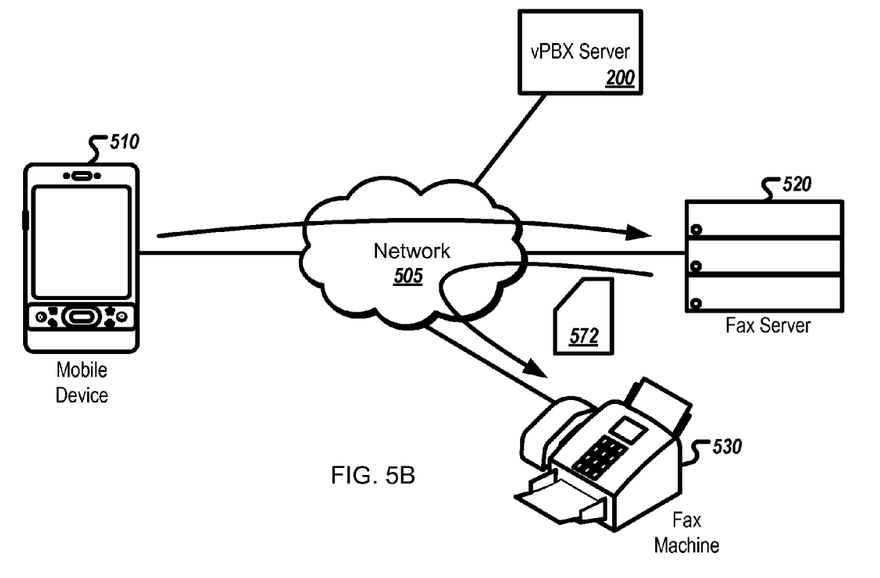
FIG. 5B illustrates an alternative structure and flow in which a mobile device sends out a fax to a recipient.

FIGS. 5A and 5B are diagrams of two example flows for transmitting faxes through a mobile device. FIG. 5A illustrates a structure and flow in which the mobile device sends out a fax to a recipient 530. In FIG. 5A, the mobile device 510 is connected to a vPBX network. The vPBX network can include at least one vPBX server 200. The vPBX server 130 can include a fax manager 225. The vPBX network can also include a fax server 520. The fax server 520 can be managed by the fax manager 225. The mobile device 510, vPBX server 130, and fax server 520 can be connected by a communications network 505. The communication network 505 can be a data network (e.g. Internet) and/or a switched network (e.g. PSTN). The data network and switched network can be connected by a telephony gateway. A destination fax machine can be within the vPBX system or outside the vPBX system. The destination fax machine can include a fax machine connected to a PSTN network or on a data network.

In some implementations, the mobile device 510 can retrieve a fax document template 522 from a fax server 520 and store the retrieved template in the memory of mobile device 510. The retrieval of fax document template 522 can include a data transfer using the HTTP protocol. The data transfer can be managed by the fax manager 225 in the vPBX server 200. After retrieving the fax document template 522 from the fax server 520, the vPBX system can permit the user to insert text in the fax document template 522. The vPBX system can insert some or all data fields in the fax document template 522. Alternatively or additionally, the user can insert some or all data fields in the fax document template 522 to generate the fax document 524.

The user can authenticate the fax document 524 by providing a signature. The signature can be a hand-written signature on a touch-sensitive screen on the mobile device 510. The signature can be inserted into the fax document 524 as an image. The signature can also be another form of electronic signature. The signed fax document can be sent to the destination device 530 either directly from the mobile device 510 or from the fax manager 225 in the vPBX server 200.

In some implementations, the mobile device 510 can send the signed fax document 524 to the destination fax machine 530. The sending of the fax document 524 can be achieved by creating a virtual connection between the mobile device 510 and the destination fax machine 530. The connection can be managed by the vPBX server through a telephony gateway.

In some implementations, the user can send the signed fax document through the fax manager 225. The fax document can be sent from the mobile device 510 to the vPBX server 200 using the Internet Message Access Protocol (IMAP), Post Office Protocol 3 (POP3), Simple Mail Transfer Protocol (SMTP), or other readily available messaging protocols. The fax manager 225 can perform record keeping tasks such as archiving the fax document, recording user information, recording billing information, etc. Subsequently or concurrently, the fax manager 225 can send the fax to the destination fax machine 530. The transmission between the fax manager 225 and the destination fax machine 530 can be through a messaging protocol or a fax over IP (FoIP) protocol, such as a T.38 fax relay standard.

FIG. 5B illustrates an alternative structure and flow. The mobile device 510, vPBX server 200, and fax server 520 can be connected by a network 505. The fax server 520 can store one or more fax document templates. The mobile device 510 can instruct the fax server 520 to create a fax document and send the fax document to the destination fax machine 530. The mobile device 510 can send the fax instruction by selecting a fax document template, creating a new fax document, signing the fax document, and providing a fax destination number to the fax manager 225 in the vPBX server 200.

In some implementations, the mobile device 510 can act as a remote display device for the fax server 520. The mobile device 510 can select a fax document template from a plurality of fax document templates stored on the fax server 520. The mobile device 510 can instruct fax server 520 to load the selected fax document template to a memory area on the fax server 520. The mobile device 510 can invoke a word processing program on either the mobile device 510 or the fax server 520 to edit the selected fax document template, including manually or automatically inserting values to data fields, inserting text, and inserting recipient name and number to generate a fax document 572. The mobile device 510 can authenticate the fax document 572 by digitally signing the fax document 572. The digital signature can be entered by a user on a touch-sensitive screen of mobile device 510. The digital signature can also be pre-stored on the fax server 520. The digital signature can be inserted into the fax document 572 upon, for example, the fax server authenticating a user's identity. The fax server 520 can authenticate a user's identity through a log-in process, whereupon the user enters a username/password combination. The fax server 520 can also authenticate the user's identity by requiring the user's mobile device be located at a predefined geographic location, such as in office, or at a certain address. The fax server 520 can also authenticate the user's identity by using biometric information. For example, the fax server 520 can compare the user's voice with a stored voice sample; the fax server 520 can apply facial recognition technology on a self-portrait of a user, if the user's mobile device supports real-time image capture; the fax server can also require a user to perform a pre-defined physical movement, such as waving a mobile device in a specific form, if the user's mobile device can sense motion.

The fax server 520 can archive the fax document 572 and send the fax document 572 to a destination fax machine 530. Sending a fax document through the fax server 520, rather than from the mobile device 510, can have an advantage of a "send and forget" feature. The destination fax machine 530 can be busy or unavailable. The fax server 530 can be configured to implement re-dialing functions when the fax machine 530 can not receive a fax transmission. The re-dial function can attempt to resend the fax document 572 after preconfigured intervals, e.g., redial immediately, redial again after one minute, redial again after five minutes, etc. The fax server 520 can also create an error report after a certain number of redials. The redial and error reporting functions on the fax server 520 can be configured and controlled on the mobile device 510. If the redial and error reporting functions are implemented on the fax server 520, the user of the mobile device 510 can "forget" the fax after the user presses a "send" button. The user can perform other functions on the mobile device 510 while the fax server 520 attempts to resend the fax.

Example Processes for Signing a Fax

Figure 6A:
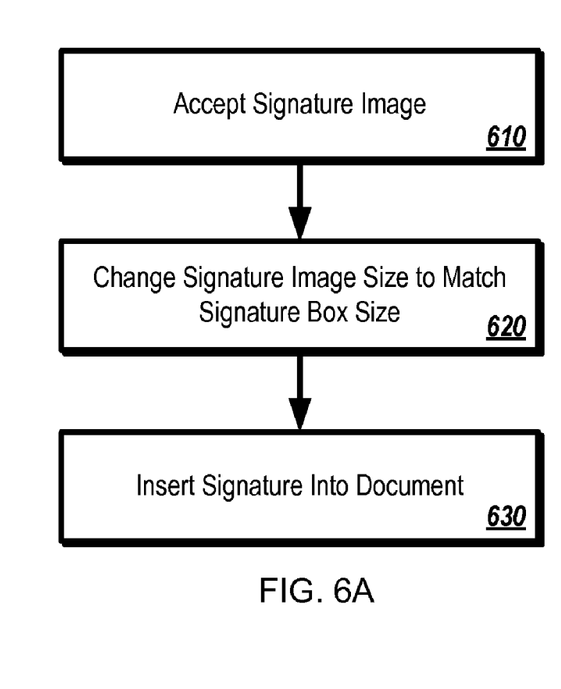
FIGS. 6A and 6B are flowcharts illustrating two example processes for signing a fax document.
Figure 6B:
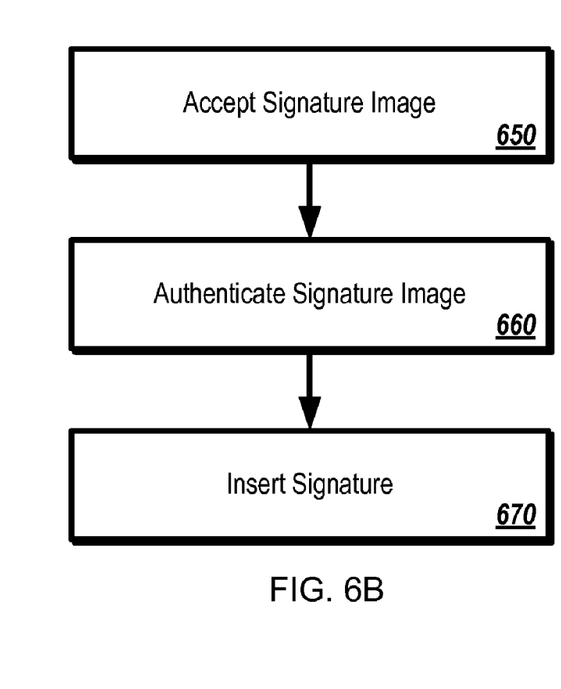

FIGS. 6A and 6B are flowcharts illustrating two example processes for signing a fax document. In FIG. 6A, a vPBX server inserts a signature image into a fax document in process 600. The vPBX system accepts the signature as an image (610). A user can enter a signature on a touch-sensitive screen of the mobile device through a signature-input user interface.

The mobile device can proportionally resize the signature image to a proper size (620). The proper size can be pre-defined in a fax document template, where a signature field's geometry can be specified. The signer can also determine a proper size, for example, by dragging and resizing the signature image on the display screen of the mobile device.

The mobile device or the fax server can insert the signature into the fax document (630). The signature can be at a fixed position in the fax document, or can be in a "floating" position, when the user drags-and-drops the signature image to a place. The fixed position or floating position can be defined in a fax document template. The insertion of the signature image can differ from insertion of a regular image. The insertion of the signature can "lock" the fax document. Locking the fax document disables further modification of data and text fields in the fax document. If the user attempts to edit the fax document after the user signs the fax document, the user's previous signature can be removed. The user can be required to sign the fax document again before transmission. In some implementations, if a user other than the user has signed the fax document, the user's editing of the fax document is disabled. The user can add the user's own signature to the fax document after another user has signed the fax document if multiple-signature function is configured for the fax document. Multiple-signature functions can be implemented on the fax manager 225, and managed by the mobile device.

In FIG. 6B, the vPBX server can insert a signature into the fax document. The actual signature inserted by process 640 can visually differ from a signature image entered by the user.

The vPBX server can accept the user's signature as an image (650). The user can enter the signature on a touch-sensitive screen of the mobile device through a signature-input user interface.

The vPBX uses the signature image to authenticate that the signer is a person authorized to send the fax document (660). A list of persons authorized to send a fax document can be stored in the fax server. The list of persons can be associated with other data in the fax server to provide restrictions on fax transmissions. Such persons can include, without limitation, users that can only send fax transmissions to a list of destination numbers; users associated with certain billing accounts; users that can only send fax transmissions from authorized locations, and the like. The vPBX server can enforce an authorized location rule by permitting the mobile device to send a fax only when the mobile device's current geographic location is at a pre-defined location. The mobile device's current geographic location can be retrieved from a positioning system to which the mobile device is attached or connected.

The signer can be authenticated by a signature image in addition to a username/password authentication. The user's signature image can be compared with an image stored on the fax server. The comparison can be implemented by various image comparison or signature recognition processes.

A signature can be inserted into the fax document (670). The signature can be either the signature image received previously or another signature image stored on a fax server. Inserting the signature into the fax document can allow the vPBX fax server to insert the signature to a plurality of fax documents without the user having to sign each fax document individually.

Example User Interface for Signing a Fax

Figure 7:
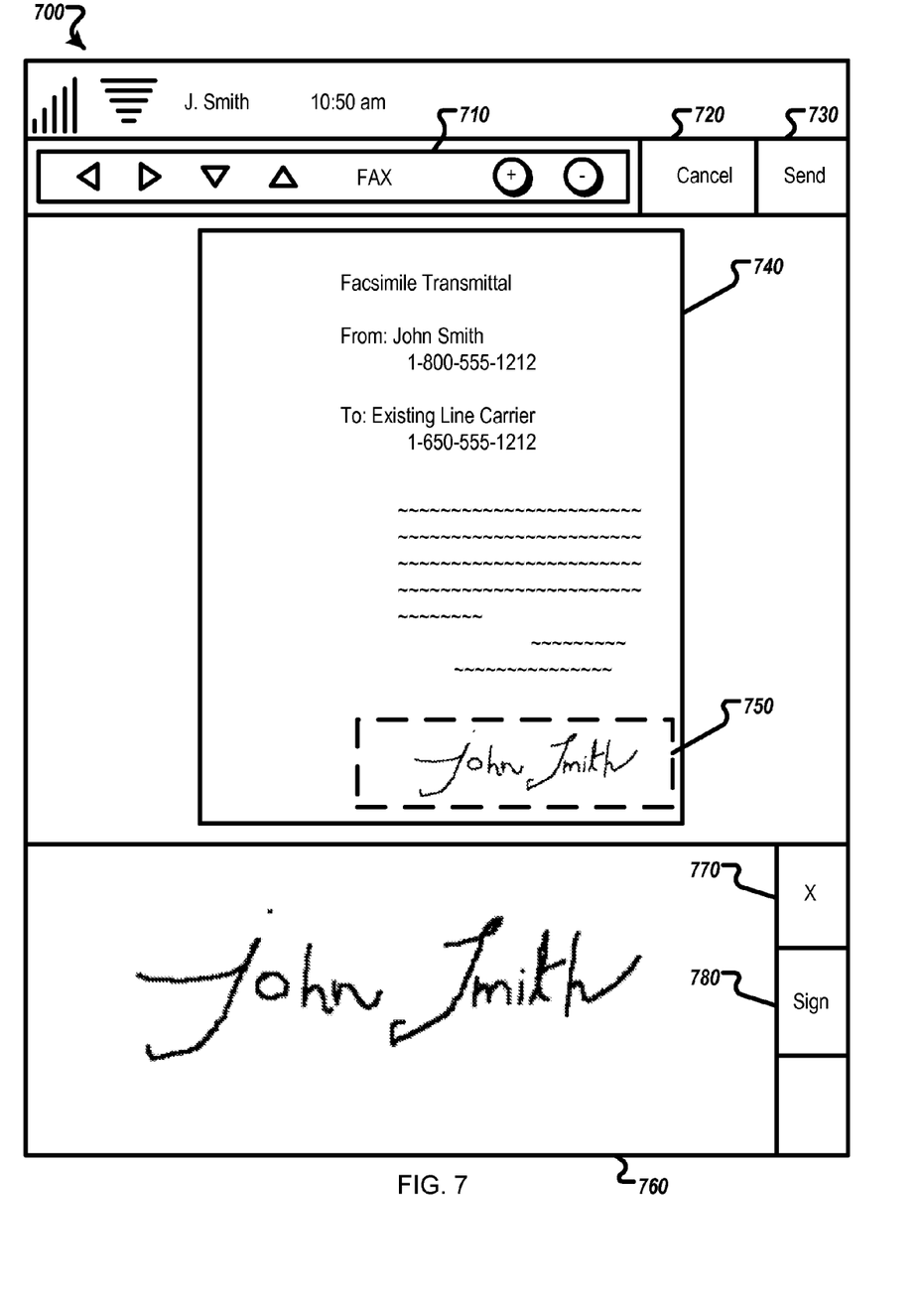
FIG. 7 shows an example of a user interface to allow a user to define availability status based on a present location of a mobile device.

FIG. 7 shows an example user interface for signing a fax document. An example touch-sensitive display screen 700 for a mobile device is shown. A user has created a fax document in the memory of the mobile device. The content of the fax document is shown in fax document box 740. In some implementations, a user can view and edit the fax content by interacting with the fax document shown in the fax document box 740. In some other implementations, a user can navigate the fax document box 740 by using a navigation bar 710. Navigation bar 710 can contain scroll buttons to allow a user to scroll up, down, left, or right. Navigation bar 710 can also contain zoom buttons to allow a user to zoom in or zoom out.

Touch-sensitive screen 700 can display a signature input area 760. The user can provide a hand written signature by signing in the signature input area 760 with a finger, a touch stylus pen, or any other device that can draw on a touch-sensitive screen or device. The user can also provide a handwritten signature by other means. For example, if the mobile device is coupled with or is connected to a motion sensor, the user can create a signature by waving the mobile device. The motion sensor can track the movement. A program running on the mobile device or on the vPBX server can generate a signature image based on the tracked movement. After signing the user's name, the user can interact with the cancel button 760 to cancel the signature, or the sign button 780 to enter the signature into the fax document.

If the fax document contains a pre-defined signature area 750, the user's signature in the signature box can be scaled to the size of the signature area 750 and entered into the signature area 750, upon, for example, the user tapping the sign button 780.

If the fax document does not contain the signature area 750, the mobile device can create an image in the fax document box 740 upon selection of the sign button 780. The user can resize the image, and drag the image to a place in the fax document box 740.

The effect of inserting a signature image into a fax document can differ from inserting non-signature images. In some implementations, inserting the signature image by tapping a sign button can create a lock on the fax document. The lock can be stored as part of the document. Alternatively, the lock can be stored on the mobile device or on the vPBX server. If the fax document signer edits the fax document after signing, the signer can be prompted to either discard the editing, or invalidate the signer's prior signature. If the user edits the fax document that has been signed by the first signer, the user's editing of the fax document can be disabled.

After the user's signature is inserted in the signature area 750, the user can either cancel the fax document by interacting with the cancel button 720, or send the fax document with the send button 730. The fax document template can specify that signature is required for the fax to be sent. If the user is using a "signature required" fax document template, the send button 730 can be disabled until the user signs the fax document. After sending the document, the user cannot be allowed to further modify the document without invalidating the user's own signature.

Generic Computing Devices

Figures 8A, 8B:
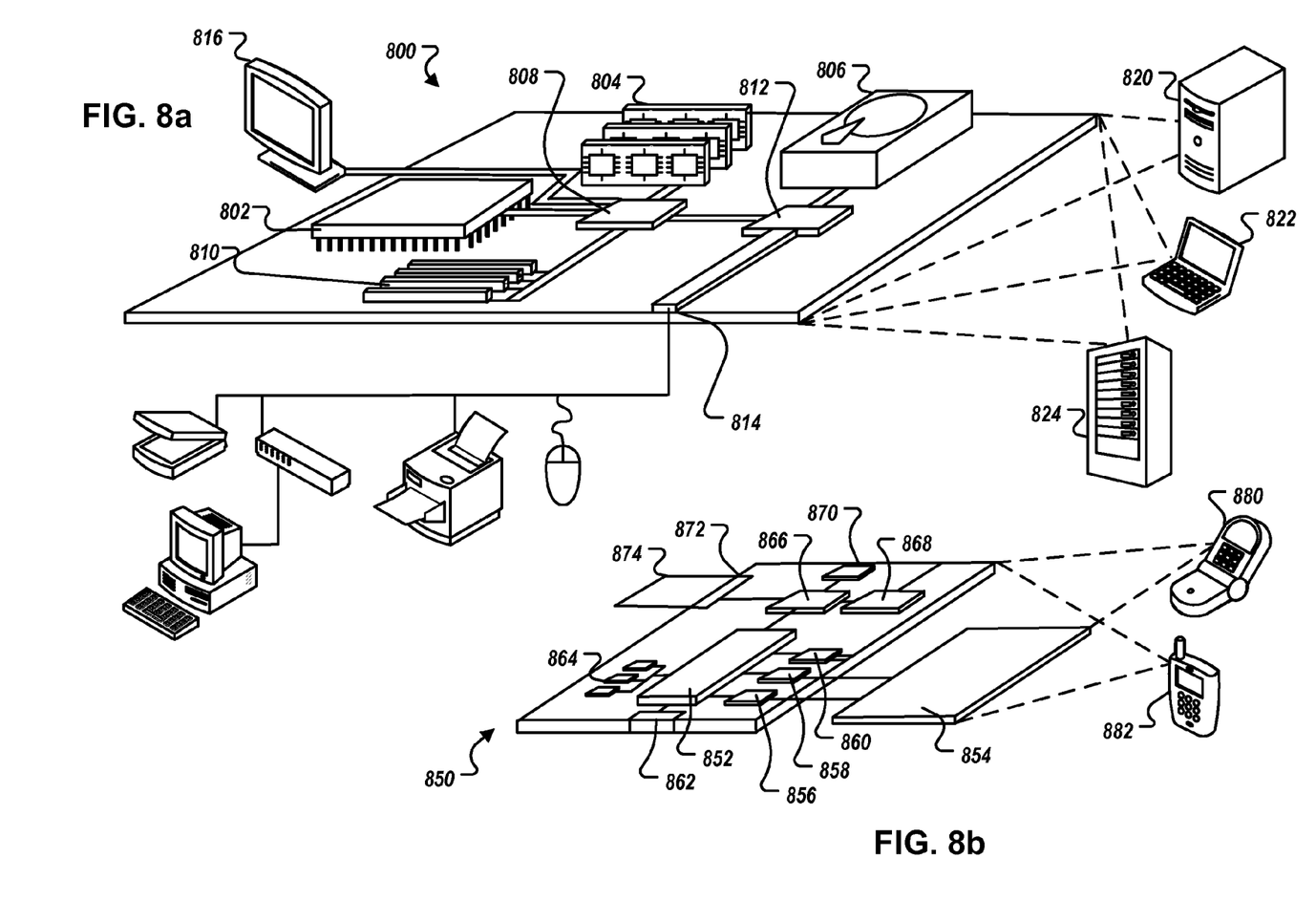
FIG. 8A and FIG. 8B are block diagrams of a computing device that can be used to implement processes and methods described in relation to the call management system shown in FIG. 1.

FIG. 8A and FIG. 8B are block diagrams of a computing device that can be used to implement processes and methods described in relation to the call management system shown in FIG. 1. Computing device 800 can represent various forms of digital computers, such as laptops, desktops, workstations, personal digital assistants, servers, blade servers, mainframes, and other appropriate computers (e.g., user terminal 126). Computing device 850 can represent various forms of mobile devices, such as personal digital assistants, cellular telephones, smartphones, and other similar computing devices used to place or receive the calls. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a computer-readable medium. In one implementation, the memory 804 is a volatile memory unit or units. In another implementation, the memory 804 is a non-volatile memory unit or units.

The storage device 806 is capable of providing mass storage for the computing device 800. In one implementation, the storage device 806 is a computer-readable medium. In various different implementations, the storage device 806 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of duties is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can process instructions for execution within the computing device 850, including instructions stored in the memory 864. The processor may also include separate analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD display or an OLED display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may provide, for example, for wired communication (e.g., via a docking procedure) or for wireless communication (e.g., via Bluetooth or other such technologies).

The memory 864 stores information within the computing device 850. In one implementation, the memory 864 is a computer-readable medium. In one implementation, the memory 864 is a volatile memory unit or units. In another implementation, the memory 864 is a non-volatile memory unit or units. Expansion memory 874 may also be provided and connected to device 850 through expansion interface 872, which may include, for example, a SIMM card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS receiver module 1270 may provide additional wireless data to device 850, which may be used as appropriate by applications running on device 850.

Device 850 may also communication audibly using audio codec 860, which may receive spoken information from a user and convert it to usable digital information. Audio codex 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smartphone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of the search systems and methods have been described, it should be recognized that numerous other applications are contemplated. While reference is made to determining hierarchical data associated with a resource determined as a search result, hierarchical data can be associated with a resource identified by other means. For example, hierarchical data can be determined for a resource and associated with that resource, where a visual representation of the hierarchical data can be attached to the resource for display to a user in an email message. The resource may be the result of a request made by a user to customer service support on a web site for specific information included on the web site. Accordingly, other embodiments are within the scope of the following claims.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations have been described. Nevertheless, it will be understood that various modifications can be made without departing from the spirit and scope of the invention. For example, the examples were given in C programming language. However, the programmable compiler can be implemented for any imperative computer programming language. Also, the function exp was given to illustrate the efficiency of a reduced accuracy routine. Other mathematical functions can be written to increase efficiency from the standard functions. Accordingly, other implementations are within the scope of the following claims.

A number of implementations of the invention have been described. Nevertheless, it will be understood that various modifications can be made without departing from the spirit and scope of the invention. Accordingly, other implementations are within the scope of the following claims.

What is claimed is:

1. A method for porting line numbers in a telecommunications network, the method comprising:
   receiving a request from a mobile device to migrate a phone number associated with a user from an existing service provider to a new service provider;
   retrieving migration information associated with the existing service provider from a database;
   receiving authorization information from the mobile device associated with the user;
   generating a fax migration document including the migration information and the authorization information; and
   transmitting the fax migration document to the existing service provider,
   where generating the fax migration document includes:
   retrieving a document template;
   retrieving user information associated with the user;

inserting the user information into the document template; and generating the fax migration document using the document template containing the user information.

2. The method of claim 1, where retrieving migration information includes identifying a transmission means by which the fax migration document is to be transmitted to the existing service provider; and where transmitting the fax migration document includes transmitting the fax migration document using the identified transmission means.

3. The method of claim 2, where the identified transmission means includes fax transmission; and where generating the fax migration document includes inserting the migration information and the authorization information into the fax migration document.

4. The method of claim 2, where retrieving user information associated with the user includes determining the user information based on device information of the mobile device.

5. The method of claim 1, where retrieving migration information includes identifying one or more authorization requests for authorizing the migration of the phone number.

6. The method of claim 5, where receiving authorization information from the mobile device includes:

displaying the one or more authorization requests to the user through the mobile device; and receiving one or more authorization responses to the one or more authorization requests displayed to the user.

7. The method of claim 1, further comprising establishing a temporary line to allow the user to transmit or receive calls using the temporary line while the migration of the phone number is pending.

8. The method of claim 1, where receiving the request includes receiving the phone number from the user, the method further comprising:

identifying the existing service provider based on the received phone number.

9. The method of claim 1, where generating the migration document includes:

identifying a calling plan and a geographic location associated with the phone number; and identifying the migration document based on the identified calling plan and geographic location.

10. The method of claim 1, where receiving authorization information includes receiving a digital signature from the mobile device.

11. A method for porting line numbers in a telecommunications network, the method comprising:

retrieving information at a mobile device, the information including at least one of user information or mobile device information;

generating, at the mobile device, a request associated with creating a fax migration document by a server using the retrieved information, the fax migration document containing migration information associated with an existing service provider and the retrieved information; and transmitting the request to the server, where generating the request includes:

receiving the fax migration document from the server;

editing the fax migration document to include the retrieved information;

generating the request based on the edited fax migration document; and authenticating the request by digitally signing the request.

12. The method of claim 11, where generating the request includes generating instructions to instruct the server to authenticate the request using the retrieved information.

13. The method of claim 12, where generating instructions includes generating instructions to instruct the server to retrieve a pre-stored digital signature and to authenticate the request using the pre-stored digital signature.

14. The method of claim 13, where generating instructions includes generating instructions to instruct the server to create the fax migration document using the authenticated request.

15. The method of claim 11, where transmitting the request to the server includes transmitting the request to a private branch exchange server through which the fax migration document is sent to the existing service provider.

16. A method for porting line numbers in a telecommunications network, the method comprising:

accessing a remote server using a mobile device to retrieve a fax migration document stored on the remote server, the fax migration document containing a request to migrate a phone number associated with the mobile device from an existing service provider to a new service provider;

manipulating the fax migration document through an interface provided by the mobile device;

authenticating the manipulated fax migration document using the interface; and transmitting the authenticated fax migration document from the remote server to the existing service provider, where authenticating the manipulated fax migration document includes:

determining a geographic location associated with the mobile device; and authenticating the manipulated fax migration document using the determined geographic location, where authenticating the manipulated fax migration document includes authenticating a user associated with the mobile device.

17. The method of claim 16, where manipulating the fax migration document includes sending one or more editing commands from the mobile device to the remote server to edit the fax migration document.

18. The method of claim 16, where authenticating the manipulated fax migration document includes digitally signing the manipulated fax migration document using the interface.

19. The method of claim 18, where digitally signing the migration document includes:

inserting a digital signature onto the manipulated fax migration document; and disabling modification of the fax migration document after inserting the digital signature.

20. The method of claim 19, where inserting the digital signature includes manually signing the manipulated fax migration document using the interface.

* * * * *

UNITED STATES PATENT AND TRADEMARK OFFICE
CERTIFICATE OF CORRECTION

| | | |
|---|---|---|
| PATENT NO. | : 8,204,479 B2 | Page 1 of 1 |
| APPLICATION NO. | : 12/620915 | |
| DATED | : June 19, 2012 | |
| INVENTOR(S) | : Vlad Vendrow et al. | |

It is certified that error appears in the above-identified patent and that said Letters Patent is hereby corrected as shown below:

On Col. 2, line 61, delete "cancancan".

Signed and Sealed this
Twenty-first Day of August, 2012

David J. Kappos
*Director of the United States Patent and Trademark Office*